United States Patent [19]
Stirling et al.

[11] Patent Number: 5,923,662
[45] Date of Patent: Jul. 13, 1999

[54] COMMUNICATION SYSTEM MESSAGE ACKNOWLEDGEMENT

[76] Inventors: Andrew J. Stirling, 68 Ruden Way, Epsom Downs, United Kingdom, KT17 3LP; Patrick Heck, Hauptstrasse 42A, 76448 Durmersheim, Germany, 76448; Andreas Stiegler, Epernayerstrasse 34, 76275 Ettlingen, Germany, 76275

[21] Appl. No.: 08/661,488

[22] Filed: Jun. 11, 1996

[30] Foreign Application Priority Data

Jun. 12, 1995 [GB] United Kingdom .................. 9511914

[51] Int. Cl.⁶ ................................ H04J 3/26; H04L 1/08
[52] U.S. Cl. ............................... 370/432; 371/32; 371/33
[58] Field of Search .................... 370/432, 452, 370/460, 421, 390, 392, 424; 371/32, 33; 340/825.44, 825.47

[56] References Cited

U.S. PATENT DOCUMENTS

| | | |
|---|---|---|
| 4,759,015 | 7/1988 | Takai et al. . |
| 4,888,767 | 12/1989 | Furuya . |
| 4,926,375 | 5/1990 | Mercer et al. .......................... 370/432 |
| 4,998,245 | 3/1991 | Tanaka et al. ............................ 370/43 |
| 5,097,469 | 3/1992 | Douglas . |
| 5,216,675 | 6/1993 | Melliar-Smith et al. . |
| 5,343,475 | 8/1994 | Matsuda et al. ........................ 371/432 |
| 5,517,507 | 5/1996 | Needham et al. ........................ 371/32 |
| 5,596,588 | 1/1997 | Nobutoki et al. ........................ 371/32 |

FOREIGN PATENT DOCUMENTS

| | | |
|---|---|---|
| 2085959 | 12/1992 | Canada . |
| 0303830 | 2/1989 | European Pat. Off. . |
| 0658028A2 | 11/1994 | European Pat. Off. . |
| 19503215 | 2/1996 | Germany . |
| 06205008 | 7/1994 | Japan . |

OTHER PUBLICATIONS

"Audio Local Area Network Chip For Cars" by Knapp and Hetzel, 92nd Convention of the Audio Engineering Society, Mar. 24–27, Vienna.

Mbarki et al, "A Scheme For Improved Multicast Efficiency in a Ring Network", Proceedings of the International Phoenix Conference on Computers an Communications, Tempe, Mar. 23–26, 1993, Institute of Electrical and Electronics Engineers, pp. 332–338.

*Primary Examiner*—Chau Nguyen
*Assistant Examiner*—Soon-Dong Hyun
*Attorney, Agent, or Firm*—Nixon & Vanderhye P.C.

[57] ABSTRACT

A local communication system includes a number of stations interconnected for the communication of messages via a serial data channel. A first station transmits a directed type of message to individual ones of the other stations, or transmits a broadcast type of message to all or a subset of the other stations. For a broadcast message, any receiving station unable to accept the message transmits a common negative acknowledgment signal and the first station re-transmits the message up to five times. Each receiving station may be unable to accept a message because its receive buffer is still occupied by a previous message. In such a case generation of the negative acknowledgment signal is suppressed if the message which cannot be accepted is judged identical to the message occupying the receive buffer of the receiving station. In this way, unnecessary communication is avoided, and certainty of communication is increased.

33 Claims, 6 Drawing Sheets

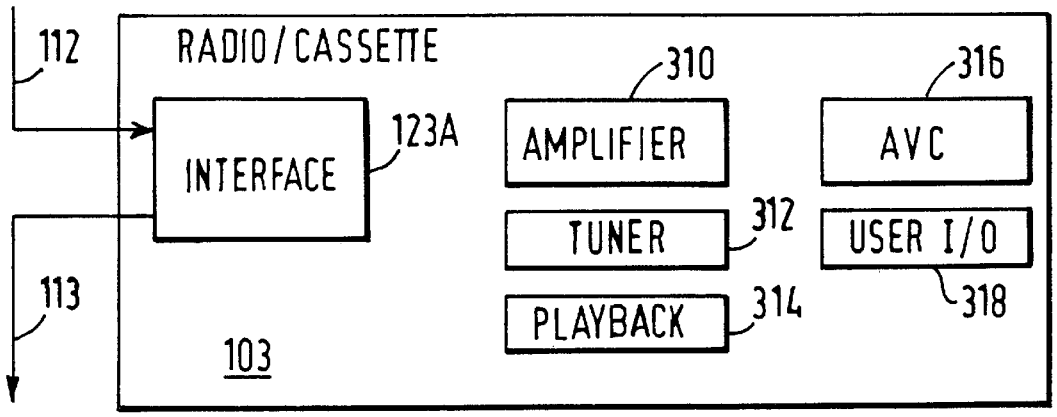
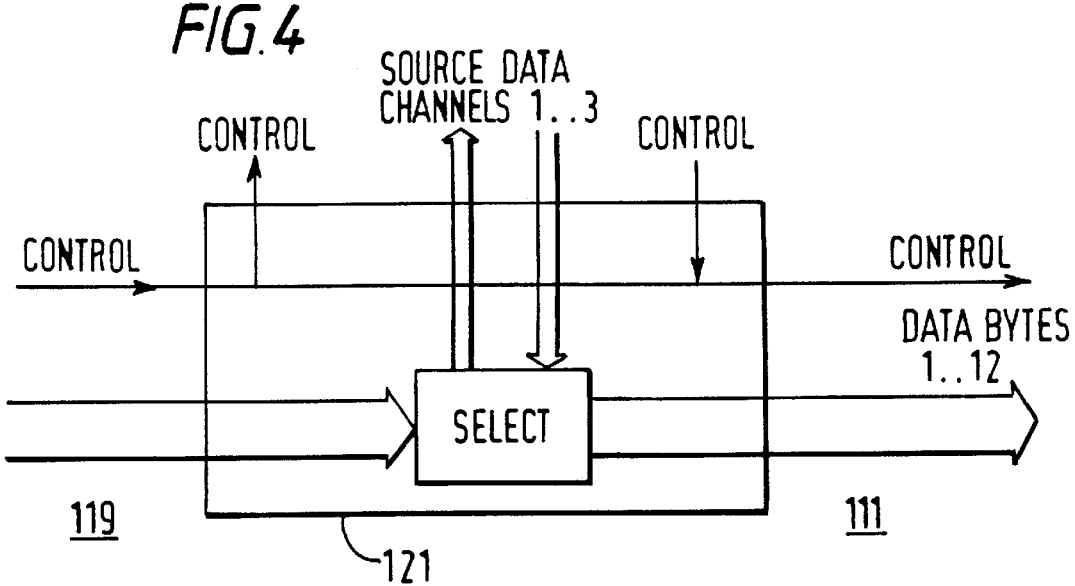

COMMUNICATION SYSTEM MESSAGE ACKNOWLEDGEMENT

BACKGROUND OF THE INVENTION

1. Field of the Invention

The present invention relates to a local communication system comprising a plurality of stations interconnected for the communication of messages via a serial data channel. The invention further relates to apparatuses for use in such a system, and diagnostics apparatus for use with such a system.

2. Related Art

A system of this type has been described for example by Knapp and Hetzel in a paper "Audio Local Area Network Chip For Cars", presented at the 92nd Convention of the Audio Engineering Society, Mar. 24–27, 1992, Vienna. Knapp and Hetzel propose use of the well known SPDIF format for the transmission of digital audio signals among the various components of a car audio system, and incorporate within that format eight channels for the transmission of control messages in parallel with the audio signals.

In the system of Knapp and Hetzel, known as A-LAN for short, each station (each apparatus) is constructed and configured to transmit on a respective one of the eight control channels, while receiving messages from others of the stations on the remaining seven channels.

Some practical problems arise in the implementation of such a system. Firstly, the allocation of channels as described limits the number of stations connected in the ring network. The reference indicates how one might exceed this limit by providing multiple rings, with one of the stations acting as a gateway to the other ring. Such a gateway is complicated and costly to implement, however, and effectively increases the cost of adding a ninth station to an A-LAN system.

Secondly, each station may find itself obliged to receive unrelated messages simultaneously on several channels. This necessitates costly communication management provisions, for example to buffer and prioritise these messages. At the same time, limited processing power is available for control messages in a low-cost system, and it is anticipated that often a particular message will not be accepted because the input buffer of the receiving station is still occupied by an earlier message.

SUMMARY OF THE INVENTION

In view of the above, a modified system of the type described is proposed in which a single control channel is shared by all stations. The modified system allows for control messages to be directed to a particular station, or to be "broadcast" for receipt by all stations or a specified group of stations. In order to prevent the system becoming overcrowded by many individual acknowledgements of a broadcast message, the proposed system provides only for a negative acknowledgement signal, to be received by the sending station when a broadcast message has not been accepted by at least one of the receiving stations. On the other hand, for a directly addressed message (sent from one station to a specified one other station), a positive acknowledgement is provided by the destination station if the message is accepted, and a negative acknowledgement is provided if the message is not accepted. Each message is contained within its own control message frame, and separate bit positions within the control message frame are provided specifically for insertion of the positive and negative acknowledgement signals. In this way, a sending station is able to differentiate between a message not being accepted by the destination station (for example because it has a full receive buffer, or the message is corrupted by noise) and the situation where a destination station is not present or is faulty (a major error), at least in the case of a directed message.

In this modified system, if a negative acknowledgement is received for a broadcast message, this indicates that at least one of the receiving stations did not accept the message, and the message transmission will be re-tried until no negative acknowledgement is received, up to a maximum of five retries. However, more retries than necessary will invariably result in such a system, typically up to the maximum number of retries, if one of the receiving stations is unable to accept the original broadcast message. This is because, when the first retry message is transmitted, other stations which correctly received the original message will be unable to accept the retry message because their receive buffers are occupied by the original message, yet to be processed.

It is an object of the present invention to reduce the above-mentioned problems with message acknowledgement, while retaining the advantages of the modified system just described.

The present invention provides a local communication system comprising a plurality of stations interconnected for the exchange of messages via a serial data channel, wherein a first station is operable to send a broadcast type of message to a plurality of other stations including a second station, wherein said second station is operable to perform an acceptance test on a broadcast message and to provide a negative acknowledgement signal to the first station in the event of non-acceptance of the message, wherein the first station is operable to re-send a broadcast message automatically in response to said negative acknowledgement signal being generated by at least one of the other stations, and wherein the second station is arranged not to generate the negative acknowledge signal in the case of a non-accepted received broadcast message which is a re-sending of a broadcast message previously accepted by the second station. By this mechanism, the second station will not provoke unnecessary re-sending of a message which the second station has previously accepted.

The second station may determine whether a received message is a re-sending of a previously accepted message, for example by comparing all or part of a newly-received message with a message already in its receive buffer. Particularly where each message sent by the first station identifies the first station as the source of that message, comparing the whole message will ensure that an identical message received from the same first station is judged to be a re-sending of the message already in the buffer.

In one particular embodiment of the invention, each message further includes a cyclic redundancy check (CRC) word, and the identity between original and re-sent messages is determined simply by comparing the CRC words of a new message and a message already in the buffer.

The first station may further be arranged to form each broadcast message such that a retry of an earlier message can be distinguished from a new message having identical message content. This is achieved in one embodiment of the invention by including in each broadcast message an identification number which is guaranteed to be different from that of the last broadcast message sent by the first station, but which is the same for all re-sendings of a given message. This allows the second station to identify re-sent messages, even when in normal operation the first station may send a series of otherwise identical messages.

The first station also be operable to send messages of a directed type to respective ones of the other stations. The second station receiving a message from the first station may perform the acceptance test on the message and, if the test is satisfied, provide a positive acknowledgement message to the first station, and, if the test is not satisfied, to provide said negative acknowledgement message to the first station. The first station may be operable to decide whether or not to re-send the message in dependence on the presence or absence of the positive and/or negative acknowledgement signals, and whether the message is a directed message or a broadcast message.

Each station may include a respective received message buffer and, on receipt by a station of a message, said acceptance test may include a test to determine whether the message buffer for that station is already full.

The invention further provides an apparatus for use as the second station in a system according to the invention, the apparatus comprising means for receiving through a serial data channel at least a broadcast type of message intended for plural stations connected to said data channel, and means for generating a negative acknowledgement signal in the event that a given broadcast message cannot be accepted, the second station further comprising means for suppressing generation of the negative acknowledgement signal, where the broadcast message is a re-sending of a previously accepted message.

The invention further provides an apparatus for use as the first station in a system according to the invention as set forth above, the apparatus comprising means for sending broadcast messages to plural stations via a serial data channel, and means for re-sending a given broadcast message in response to a negative acknowledgement signal generated by at least one of said plural stations, wherein each broadcast message is identified so as to distinguish between original messages and re-sent messages.

The present invention further provides diagnostics apparatus for use with a system as outlined above, the apparatus comprising means for connection to the data channel, event detection means operable to monitor broadcast messages and negative acknowledgement signals, and data handling means operable to process data from the event detection means so as to confirm operation in accordance with the invention.

BRIEF DESCRIPTION OF THE DRAWINGS

Embodiments of the invention will now be described, by way of example, with reference to the accompanying drawings, in which:

FIG. 3 represents a station with integral interface;

FIG. 4 schematically illustrates one of the interface modules of FIG. 1;

DETAILED DESCRIPTION OF THE EXEMPLARY EMBODIMENTS

Figure 1:
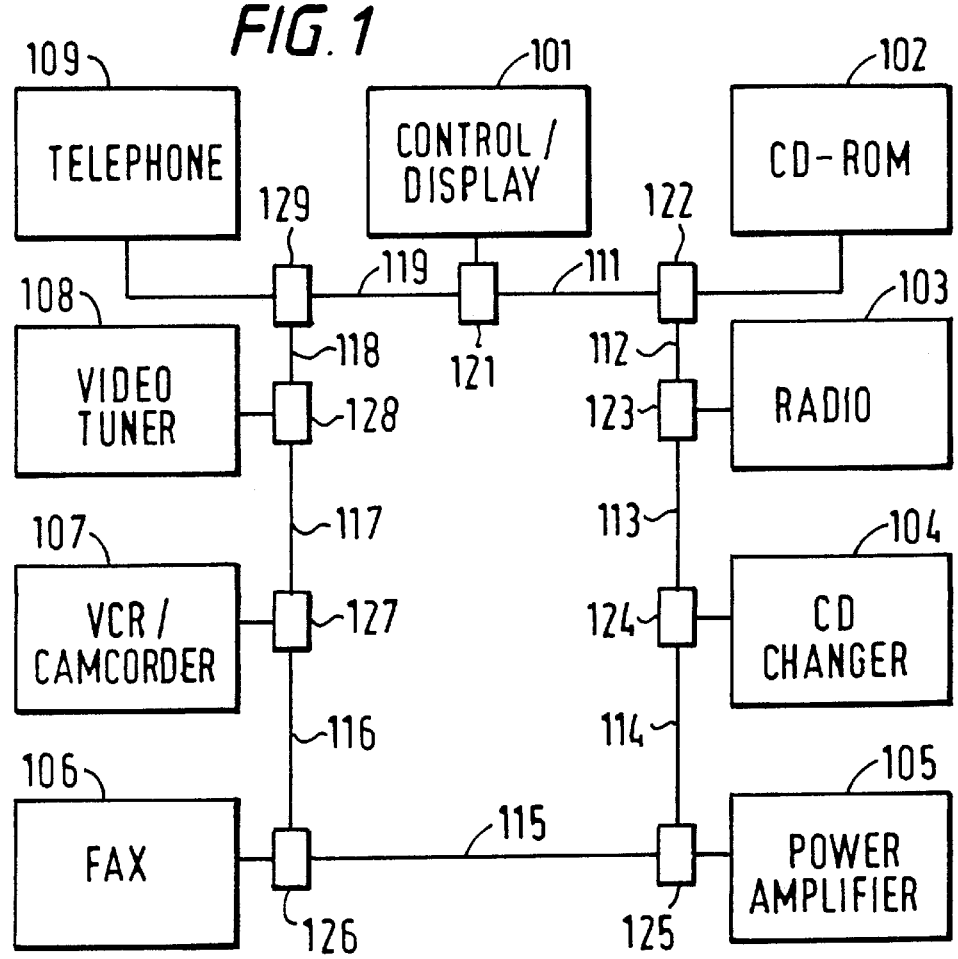
FIG. 1 shows in block schematic form a local communication system embodying the present invention.

The system illustrated in FIG. 1 comprises nine audio-related apparatuses 101–109 connected as stations (or nodes) of a Local Area Network (LAN), although it will become apparent from the following description that many more than nine stations may be accommodated. In this example system, the apparatuses are: a control and display unit 101, a Compact Disc memory (CD-ROM) reader 102, a radio tuner 103, a CD changer unit 104, an audio power amplifier 105, a facsimile send/receive unit (FAX) 106, a video recording system (VCR/CAMCORDER) 107, a video tuner 108, and a telephone 109. The display function of the control and display unit 101 may for example provide for display of information read from memory devices by CD-ROM 102 and/or display of video signals from tuner 108 or VCR 107.

The LAN interconnection comprises nine unidirectional point-to-point fibre optic links 111–119 linking interface modules 121–129, each of which is substantially structurally identical, such that the nodes are all connected in a ring. Each fibre optic link carries a combination of digital audio/video signals, CD-ROM data and control messages in accordance with a signal frame structure to be described in detail below. A designated station (referred to hereinafter as the system master), such as the control/display unit 101, continuously generates the frame structure at a frame sample rate of 20–50 kHz (preferably 44.1 kHz as for CD sampling). One station on the network is designated to act as system master on power-up although the role of system master may subsequently be re-allocated to another station.

Figure 2:
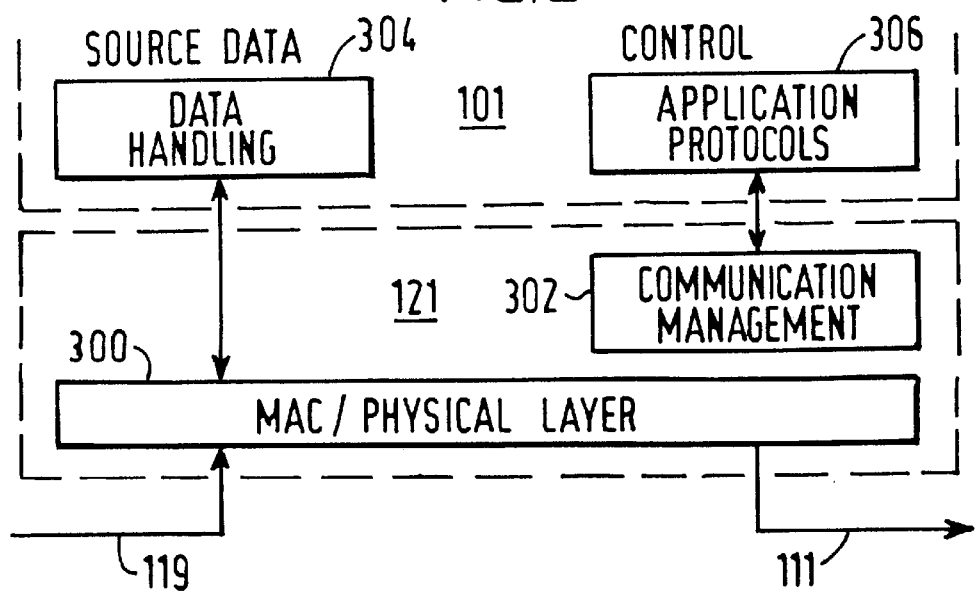
FIG. 2 illustrates the control and source data architecture used in the system of FIG. 1.

The data architecture of a station's interface to the fibre optic ring is schematically illustrated in FIG. 2. From the ring 119–111, a media access control (MAC)/physical layer 300 (to be described in greater detail hereinafter) together with a communications management layer 302 for control data are provided in interface module 121. The communications management layer 302 manages address initialisation and verification and ensures the reliable transport of messages by retransmission according to defined timing rules. Data handling for source data 304 and application protocols for control data 306 are provided at station level 101, with the application protocols defining the device/subdevice grouping and control hierarchy for the station, the format of information exchanged between products, the behaviour of devices/subdevices, and application level timing. It will be readily understood that the interface node 121 may be physically within a station. In such a case, whilst a physically separate entity, it may be considered as a subdevice from a functional point of view as shown in FIG. 3, where the interface 123A is provided within a radio cassette player 103 together with amplifier 310, tuner 312, tape playback deck 314, audio/video controller (AVC) 316 and user I/O 318 subdevices. The interconnections of the subdevices are not shown and have no bearing on the present invention, but will be readily apparent to those of ordinary skill in the art.

FIG. 4 is a schematic representation of an interface node (in this case node 121) linking a station to the fibre optic ring. All stations connected to the LAN can generate and/or receive source data and control data. The control data is of low volume, arrives in bursts and is user/event driven (e.g. user instructions or status changes), whereas the source data is a continuous high volume stream (e.g. audio, compressed video, CD-ROM data).

Software and hardware requirements are reduced in comparison with A-LAN systems as described hereinabove by providing for execution of part of the control and data channel selection functions in the interface node linking each station to the ring of fibre optic links.

Figure 5:
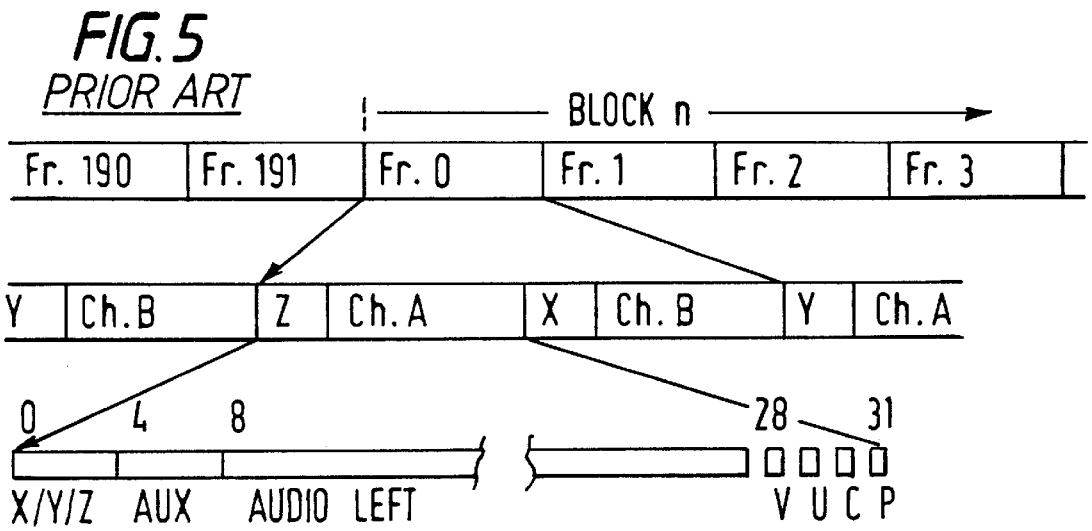
FIG. 5 shows the frame structure of digital signals transmitted according to the known SPDIF format.

FIG. 5 shows the structure of a signal in accordance with the standard IEC 958:1989 of the International Electrotechnical Commission, Geneva, otherwise known as the Sony-Philips Digital Interface Format (SPDIF). The SPDIF signal is designed to transfer digital audio signals on a point-to-point link between two products, typically at frame rates of 32 kHz, 44.1 kHz and 48 kHz. The signal is divided into blocks of 192 frames, each frame comprising two sub-frames of 32 bits. Each sub-frame includes a 20-bit field AUDIO carrying audio signal information, and various control and information bit fields, including a preamble X, Y or Z, auxiliary data field AUX, a validity bit V, a user bit U, a channel status bit C and a parity bit P. The SPDIF specifies the meanings of all these fields, with the exception of user bit U which is left free for use by the designer of a particular system. In the case of the A-LAN system, designed to transfer high quality audio and control signals to a number of products connected in a ring topology, this user bit U is used for system control.

Figure 6:
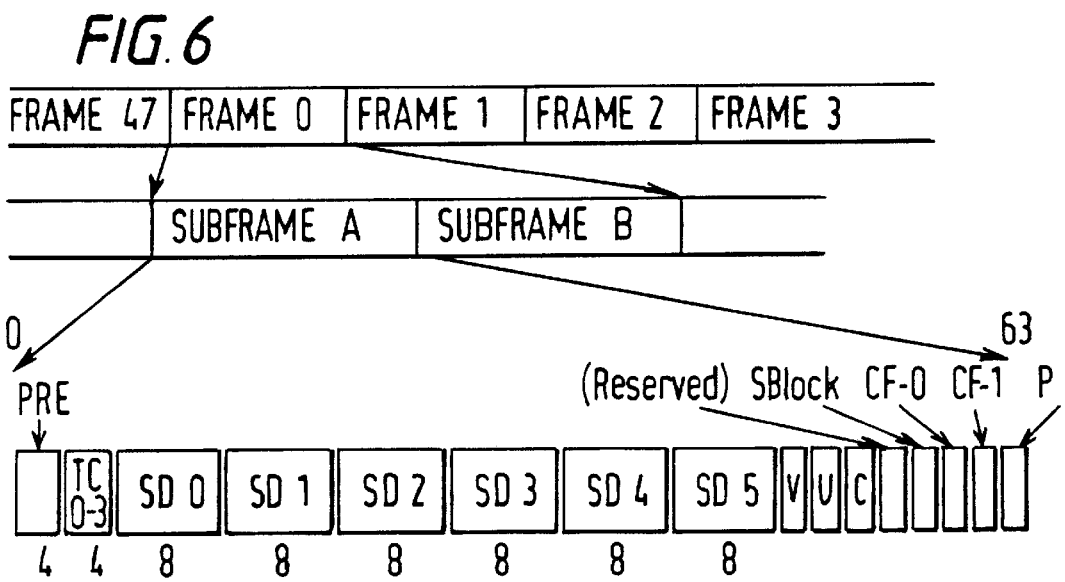
FIG. 6 shows the frame structure of digital signals transmitted between the apparatuses in the system of FIG. 1.

The structure of the message subframe used in the present system is shown in FIG. 6. Instead of the repeated 32 bit subframes of the SPDIF arrangement of FIG. 5, the message subframe of FIG. 6 is a 64-bit subframe with a 4-bit preamble (indicating left or right channel and block start), four "transparent channel" bits TCO-3, six-bytes (48-bits) of source data (audio, video etc) and eight further bits. The eight further bits comprise the three SPDIF bits V,U,C a reserved bit, an S-Block bit, two control bits CF-0, CF-1, and a parity bit P.

Figure 7:
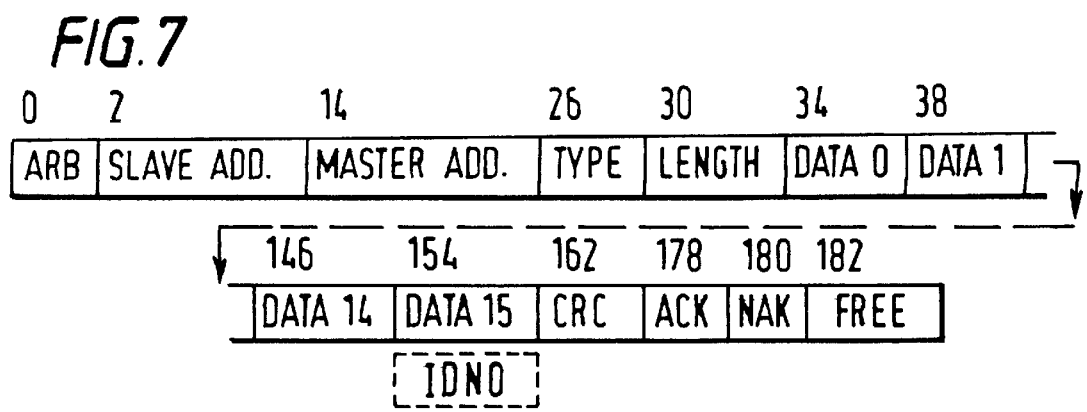
FIG. 7 shows the structure of a control frame for use with the message frame of FIG. 6.

In order to provide four "transparent" channels for bi-directional serial communication, to remove the need for a dedicated serial link without requiring an additional microcontroller, the bits TCO-3 of every subframe are reserved for transparent serial communication in four parallel channels. At a sampling frequency of 44.1 kHz, the transparent serial link capacity of the present system is 88.2 kbit/second per channel. As shown in FIG. 6, signals are divided into blocks of 48 successive message frames. At a frame sampling frequency of 44.1 kHz, the control data rate is 176.4 kbps giving approximately 920 control frames per second. The control frame is arranged (in the MAC layer; item 300, FIG. 2) as shown in FIG. 7, providing successive control functions as follows:

Arbitration ARB (2-bits): Prevents access to the control message frame by a first station when a preceding station in the loop has already "taken" the frame (unless the first station is the destination).

Slave Address (12-bits): Address for the destination of a message. The address is structure in three parts, with 4-bits identifying the application area (e.g. audio/video or telecommunication), 5-bits identifying the device type (e.g. amplifier, CD changer, display), and 3-bits identifying the device number. As will be appreciated, this allows for up to eight of each of 32 device types in each application area to a total of 4096 addressable nodes.

Master Address (12-bits): Address of the message originating station. Structured as for the Slave Address.

Message Type (4-bits): Indicating whether the message is directed to a particular station or whether it is a broadcast message intended for all stations or a specified group of stations, and other attributes of the message.

Message Length (4-bits): Indicates the length in bytes of the control message following.

Control Data (128-bits): The control field has capacity for a maximum of 16 bytes of control data in a directed message, although fewer may be carried (see Message Length above). As will be described below, the maximum in the present system is only 15 bytes in the case of a broadcast message, the space for the 16th byte being occupied instead by an identification number IDNO.

CRC (16-bits): The provision of 16-bits for cyclic redundancy checking provides a high level of reliability.

Acknowledge ACK (2-bits): Provides for positive verification of correct receipt of transmitted messages (in direct addressing mode). These bits can be modified by a receiving station and will be examined in their modified form by the transmitting station after passing round the ring network.

Negative Acknowledgement NAK (2-bits): provides for signalling non-acceptance of broadcast messages, and for signalling device presence even in the event of non-acceptance of directed messages. These bits can be modified by a receiving station and will be examined in their modified form by the transmitting station.

Free (10-bits): Allowing for specialised functions and/or expansion of the system. The last two of these are provided to allow a control message frame to be delayed by one subframe, if the message is required to be passed through the system master, as described in a German patent application DE 19503215.2 (95P10, not published at the present priority date). The remaining bits do not have a specified purpose and will be set to "0".

Figure 8:
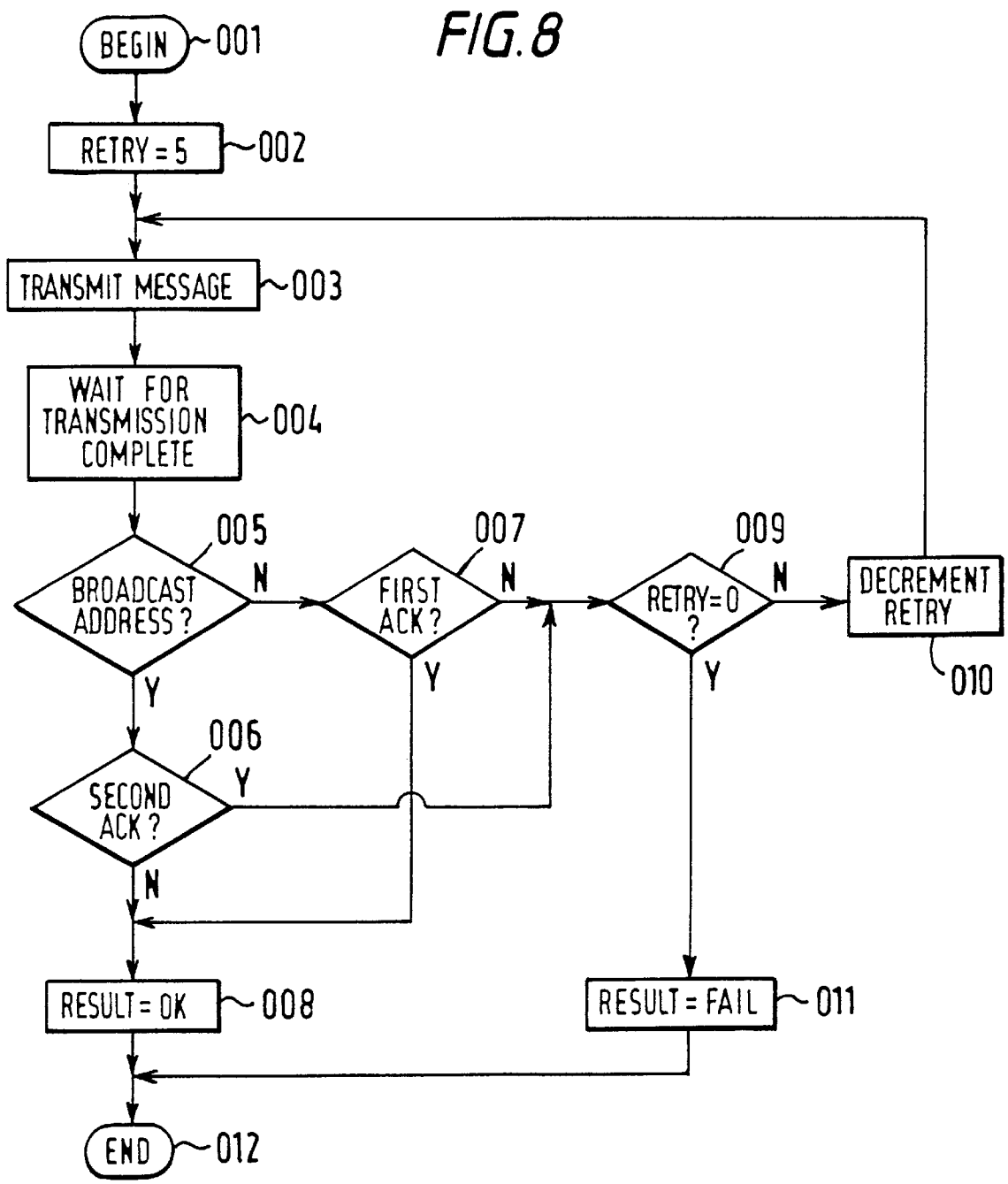
FIG. 8 is a flowchart illustrating a message acknowledgment procedure as performed by a transmitting station in the system of FIG. 1.
Figure 9:
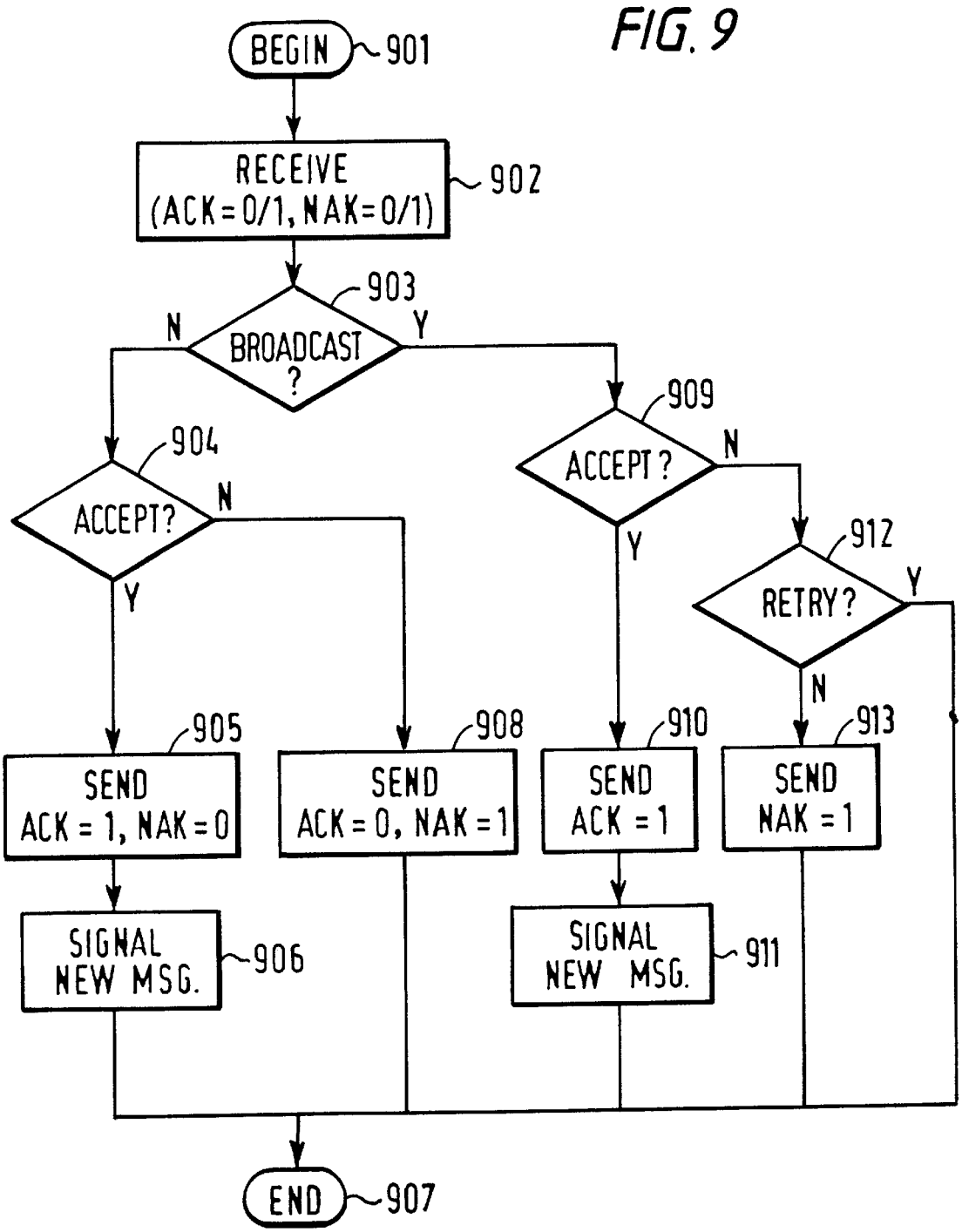
FIG. 9 is a flowchart illustrating a message acknowledgement procedure as performed by a receiving station in the system of FIG. 1.

The generation and passing of acknowledgement messages within the system is illustrated by the flowcharts of FIGS. 8 and 9. The flowchart of FIG. 8 shows actions at the transmitting side (first station) and the steps are as follows:
Step Action/Decision
001 Begin
002 Retry=5: Six attempts are permitted for the successful transmission of a message, with a Retry counter being initially set to 5
003 Transmit Message: The originating station begins sending its message either directly to a second station or as a broadcast to a number of stations; both ACK and NAK are reset to 'O' in the message as transmitted.
004 Wait: until transmission is completed.
005 Broadcast Address?: When the transmission is complete, a check is made to see whether the message is a broadcast message.
006 Second ACK?: If the message is a broadcast message, a test for non-acceptance is carried out by the receiving stations; NAK=1 will be set by at least one receiving station if the message is not properly received or cannot be accepted.
007 First ACK?: If the message is not a broadcast message (i.e. it is directly addressed to another station) a test for completeness is carried out; ACK=1 will be set by the receiving station if the message is accepted; NAK will be set to 1 if the message has been recognised but is not accepted.
008 Result=OK: If the non-completeness test of a broadcast message (step 006) is negative, or the completeness test of a conventional directly-addressed message (step 007) is positive, the message transmission is taken to have succeeded.

009 Retry=0?: A check is made to see whether the Retry counter has reached zero when the non-completeness test for broadcast messages is satisfied (step 006), or when the completeness test for conventional messages is not satisfied (step 007).

010 Decrement: Where Retry=0?: (step 009) is negative, the Retry counter is decremented and a further attempt is then made to transmit the message (return to step 003).

011 Result=Fail: If the retry counter has been reduced to zero without Result=OK (step 008) having been obtained, the transmission is taken to have failed.

012 End: Completion of the transmit procedure, with a definite result (OK or Fail) having been obtained.

FIG. 9 shows the corresponding process as performed in a station receiving a control message, as follows:

Step Action/Decision

901 Begin

902 Receive message: the interface circuit of the receiving station recognises a control message frame and detects that the message either is addressed directly to this receiving station, or is a broadcast message intended for this receiving station among others. In the form in which the message was transmitted, the acknowledgement bits are reset so that ACK=0 and NAK=0. In the case of a broadcast message, however, stations earlier in the ring network may already have set the bit ACK=1 and/or NAK=1.

903 Broadcast message? If the message is a broadcast message, control passes to step 909. If the received message is addressed directly to the present receiving station, control proceeds to step 904.

904 Accept? If the receive buffer of the receiving station has accepted the new control message, control passes to step 905. Otherwise, control passes to step 908.

905 Send acknowledge: The control message frame is passed on around the network, with bit ACK set to 1 to indicate correct receipt of the directly addressed message.

906 Signal new message: The interface circuit informs the functional elements of the receiving station that a new message has been received and is waiting in the buffer.

907 End.

908 Negative acknowledge: If the buffer is full in step 904, bit NAK is set to 1 when the control message frame is passed around the ring, to inform the transmitting station that the message has not been accepted. Control then passes directly to step 907 (End).

909 Accept broadcast message? If the broadcast message has been accepted into the receive buffer, control passes to step 910. Otherwise control is passed to step 912.

910 The positive acknowledgement bits of the control frame are set ACK=1 if the message is correctly received and accepted in broadcast mode, but the NAK bits are not modified.

911 Signal new message: The presence of a new message in the receive buffer is signalled to the functional elements of the receiving station.

912 Retry? If the broadcast mode message has not been accepted, it is determined whether the message is a retry of a message already in the received buffer of the receiving station. If so, control passes directly to step 907 (End).

913 If the broadcast message which has not been accepted is not a retry of a message already in the receive buffer, a negative acknowledgement is given to the transmitting station, by setting bit NAK=1 when passing on the control message frame to the next station in the ring network. Control then passes to step 907 (End).

In the above manner, the embodiment avoids unnecessary retries at the transmitting station by suppressing the negative acknowledgement signal, when a message cannot be accepted which is merely a retry of a message already correctly accepted in the received buffer. Otherwise, it might be found that retry messages tend to be rejected by many stations, simply because the receive buffers of those stations are occupied by an earlier sending of the same message. In such a case, it might arise that the maximum number of retries are unnecessarily performed, and that incomplete reception of the broadcast message is incorrectly assumed by the transmitting station, when in fact all stations have correctly received the message. Suppressing the negative acknowledgement in the case of retry broadcast messages therefore avoids unnecessary communication and communication management overhead in the stations of the network.

Various implementations are possible for step 912, which determines whether a broadcast message received is a retry of a message already in the received buffer. A particular method implemented in the present embodiment is simply to compare the CRC (cyclic redundancy check) bits of the new message and the message already in the buffer, since these will almost certainly be different if the content of the message and/or the identity of the transmitting station have changed. The CRC bits used for comparison with the message already in the buffer may be taken from the new message as received, or they may be calculated from the other bits of the message, as in the normal error checking procedure. If both are available, the calculated CRC bits can be compared with the received CRC bits of the new message to check at the same time for errors in the transmission of the new message. If the received CRC and the calculated CRC disagree, the receiving station may assume that the message is not a retry message, leading to a negative acknowledgement signal in step 913.

It should be noted that in the present embodiment the interface circuit does not attempt to determine whether a received message is a re-sending of an earlier received message which has already been taken from the receive buffer for processing within the second station. The second station might therefore be obliged to process the same message twice, but the advantage is that a simple modification of the interface circuit can significantly reduce burden on the network as a whole, and the higher level communication protocols can easily be arranged to cope with a message being received twice at the second station.

In systems where transmitting stations will often wish to send a series of identical messages to receiving stations, retries can be distinguished from original messages by providing a message identification IDNO within the message, which is the same for all retries of a message, but is guaranteed to be different from the IDNO included in the preceding broadcast message from the same transmitting station. As illustrated in FIG. 7, the field IDNO can replace the last data byte (bits 154 to 161) in the control message frame. It will be appreciated that for broadcast messages the number of bytes that can be transmitted per control frame is accordingly one fewer than for directly addressed messages. The identification number IDNO can be generated automatically for broadcast messages by the interface circuit, for example using a simple counter within the interface circuit, which is incremented each time a broadcast message is set. Of course, other mechanisms for distinguishing between retry messages and original messages can be implemented.

Broadcast messages may be distinguished by a particular TYPE field and/or by the use of a particular destination address in bits 2–13 of the control frame. "Group broadcasting" can also be implemented in which only a certain class of receiving station will respond to a particular group broadcast message. For example, it may often be desirable to send audio volume change messages to a number of amplifier subdevices distributed throughout the network, without burdening the communications management of other stations. A group broadcast address for amplifier subdevices can be defined, and used for this purpose.

Examples of how the available source data byte space may be used will now be described with reference to FIGS. 10 to 13. The interface at each station provides three input ports and three output ports for source data, and, subject to the maximum source data capacity of 12 source data bytes per frame, each port can be configured for example to carry 1*8, 2*8, 2*16, 2*24 or 2*32 bits per frame. Where a station is required to conform to SPDIF protocols, one of the ports can provide the SPDIF information (V, C, U) to be carried within the message frames (FIG. 6). The bit S-block indicates SPDIF block boundaries, every 192 message frames.

Figure 10:
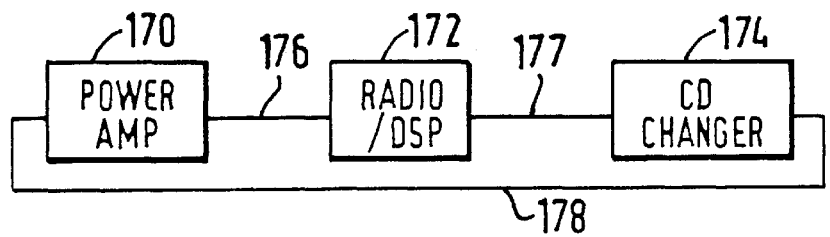
FIGS. 10 to 13 show various combinations of station types illustrating differing network function.

FIG. 10 shows an audio system comprising power amplifier 170, radio/digital signal processor (DSP) 172, and CD changer 174 joined by fibre optic links 176–178. Source bit utilisation is:

CD changer→Radio/DSP 2*16-bit
    Radio/DSP→Power amplifier 2*16 or 2*24-bit

Figure 11:
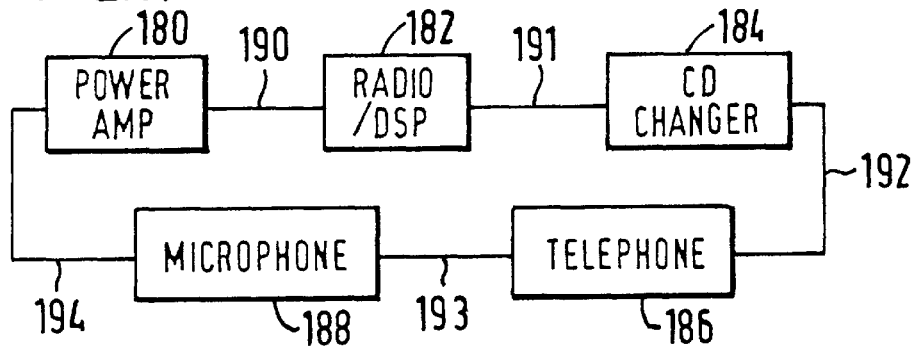

FIG. 11 shows an audio-telephone system comprising power amplifier 180, radio/DSP 192, CD changer 184, telephone 186, and microphone 188 joined by fibre optic links 190–194. Source bit utilisation is:

| | |
|---|---|
| CD changer → Radio/DSP | 2*16-bit |
| Radio/DSP → Power amplifier | 2*16-bit |
| Telephone → Radio/DSP | 2*8-bit |
| Microphone → Telephone | 2*8-bit |

Figure 12:
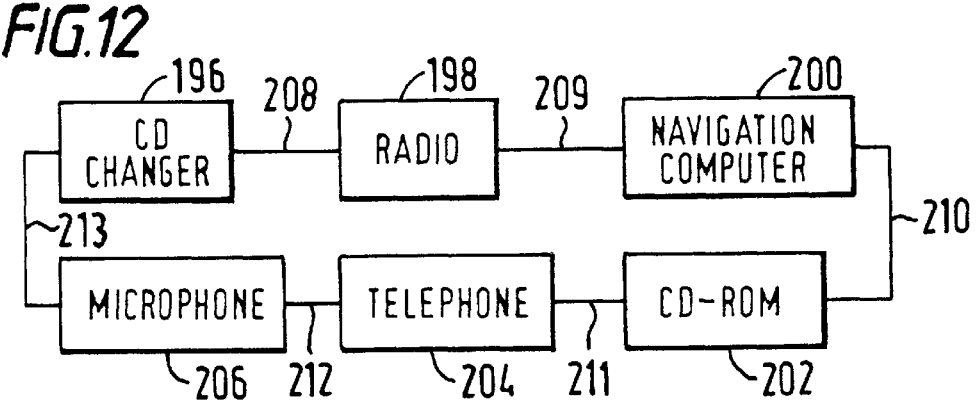

FIG. 12 shows an audio-telephone-navigation system comprising CD changer 196, radio 198, navigation computer 200, CD-ROM reader 202, telephone 204, and microphone 206 joined by fibre optic links 208–213. Source bit utilisation is:

| | |
|---|---|
| CD changer → Radio | 2*16-bit |
| Telephone → Radio | 2*8-bit |
| Microphone → Telephone | 2*8-bit |
| CD-ROM → Navigation computer | 2*16-bit |

Figure 13:
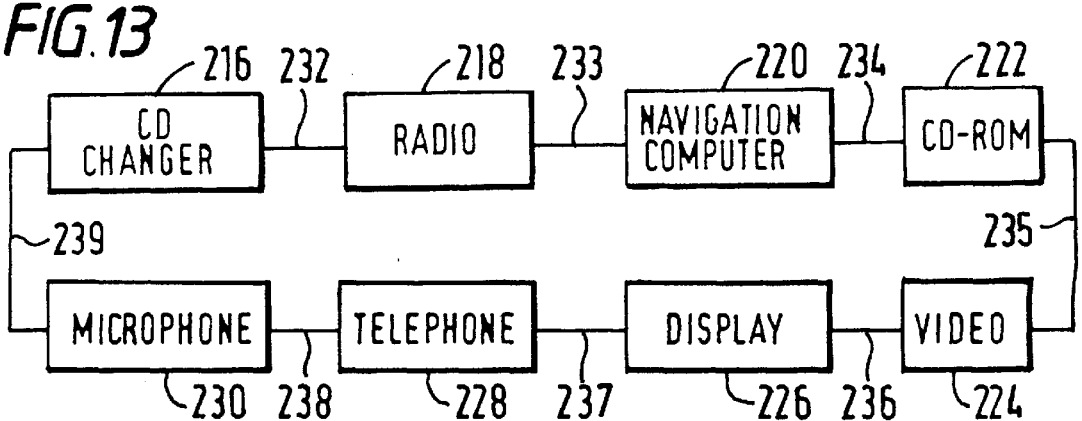

FIG. 13 shows an audio/video-telephone-navigation system comprising CD changer 216, radio 218, navigation computer 220, CD-ROM reader 222, video player (e.g. video CD player) 224, display device 226, telephone 228, and microphone 230 joined by fibre optic links 232–239. Source bit utilisation is:

| | |
|---|---|
| Audio: CD changer → Radio | 2*16-bit |
| or Video: Video CD → Display | |
| Telephone → Radio | 2*8-bit |
| Microphone → Telephone | 2*8-bit |
| CD-ROM → Navigation computer | 2*16-bit |

It will be appreciated that the above examples are not exhaustive but serve only to illustrate how the 96-bit (6 bytes per subframe) frame data capacity may be used.

It will be appreciated that the present invention is not limited to the particular embodiment described above, but can be applied wherever plural devices are required to signal negative acknowledgement through a shared channel. The fibre optic ring network can be exchanged for a single bus wire, or for a wireless communication medium.

For compactness of implementation, when ACK=0 is detected (step 007:N), meaning that a message has not been successfully transmitted, the first station in the above embodiment does not react any differently depending on the state of the NAK bit. However, it is possible as described above to distinguish between the case (NAK=1) where the message is recognised but not accepted by the destination station and the case (NAK=0) where the destination station appears not to exist, and to take action specifically appropriate to each case.

From reading the present disclosure, other modifications will be apparent to persons skilled in the art. Such modifications may involve other features which are already known in the design, manufacture and use of local communication systems, electronic apparatuses and component parts thereof and which may be used instead of or in addition to features already described herein.

What is claimed is:

1. A local communication system comprising:
    a plurality of stations interconnected for the exchange of messages via a serial data channel, each message being contained within a respective message frame of predetermined structure,
    wherein a first station is operable to send a broadcast type of message to a plurality of other stations including a second station,
    wherein said second station is operable to perform an acceptance test on a broadcast message and to provide a negative acknowledgment signal to the first station in the event of non-acceptance of the message, said negative acknowledgment signal being generated by modifying a negative acknowledgment field within the frame containing the broadcast message itself, the negative acknowledgment field being shared by said plurality of other stations such that acknowledgment signals generated by individual stations cannot be distinguished by the first station,
    wherein the first station is operable to re-send a broadcast message automatically in response to said negative acknowledgment signal being generated by at least one of the other stations, and
    wherein the second station is arranged (i) to determine whether a newly received message is a re-sending of a previously received message by comparing at least part of the newly received message with at least part of the previously received message, and (ii) to suppress generation of the negative acknowledgment signal in the case of a non-accepted received broadcast message which is a re-sending of a broadcast message previously accepted by the second station.

2. A system as in claim 1 wherein:
    said second station includes a receive buffer for temporary storage of received messages prior to processing thereof, and
    said acceptance test includes a test whether the receive buffer is occupied by a previously received message awaiting processing.

3. A system as in claim 1 wherein:
    the first station is arranged to form each broadcast message such that a retry of an earlier message can be distinguished from a new message having identical effective message content.

4. A system as in claim 3 wherein:
    message identification word is included in each broadcast message, the message identification word being the same for all re-sendings of an original message, and being different for each new broadcast message of the first station, irrespective of the effective message content.

5. A system as in claim 1 wherein:
the first station is also operable to send messages of a directed type to respective ones of the other stations.

6. A system as in claim 5 wherein:
the second station receiving a directed message from the first station is arranged to perform the acceptance test on the message and, if the test is satisfied, to generate a positive acknowledgment signal in a positive acknowledgment field within the frame containing the directed message.

7. A system as in claim 6 wherein:
the first station is operable to decide whether or not to resend the message dependent on the presence or absence of the positive and/or negative acknowledgment signals in their respective fields, and on whether the message is a directed message or a broadcast message.

8. A system as in claim 5 wherein:
the first station is arranged to form each broadcast message such that a retry of an earlier message can be distinguished from a new message having identical message content, and a retry of an earlier directed message is formed so as to be indistinguishable from a new message of having identical message content, and can convey more information than a broadcast message.

9. A system as in claim 1 wherein:
the broadcast type of message can be addressed to a particular subset of all stations in the system, such that the second station ignores a broadcast message addressed to a plurality of stations excluding the second station.

10. A system as in claim 1 wherein:
the serial data channel is provided by a succession of uni-directional data links connecting the stations in a ring network.

11. A system as in claim 1 wherein:
the serial data channel is a control channel multiplexed with one or more high capacity source data channels via a single serial data link.

12. An apparatus for use as the second station in a system according to claim 1, the apparatus comprising:
means for receiving through a serial data channel at least a broadcast type of message intended for plural stations connected to said data channel, and
means for generating a negative acknowledgment signal in the event that a given broadcast message cannot be accepted by the apparatus,
said negative acknowledgment signal being generated by modifying a negative acknowledgment field within the frame containing the broadcast message itself, the negative acknowledgment field being shared by said plurality of other stations such that acknowledgment signals generated by individual stations cannot be distinguished by the first station;
the second station further comprising means for determining whether a newly received message is a re-sending of a previously received message by comparing at least part of the newly received message with at least part of the previously received message and for suppressing generation of the negative acknowledgment signal, where the broadcast message that cannot be accepted is a re-sending of a previously accepted message.

13. An apparatus for use as the second station in a system as in claim 12 wherein:
said second station includes a buffer for temporary storage of received messages prior to processing thereof, and
said acceptance test includes a test whether the receive buffer is occupied by a previously received message awaiting processing.

14. An apparatus as in claim 13 further operable as the first station in said system, the apparatus further comprising:
means for sending through a serial data channel at least a broadcast type of message intended for plural receiving stations connected to said data channel, each broadcast message being contained within a respective message frame of predetermined structure, said message frame structure including a negative acknowledgment field modifiable by any of said receiving stations so as to generate a negative acknowledgment signal, the negative acknowledgment field being shared by such receiving stations such that acknowledgment signals generated by individual stations cannot be distinguished by said apparatus; and
means for detecting said negative acknowledgment signal when generated, and for re-sending a broadcast message automatically in response thereto.

15. An apparatus as in claim 16 further operable as the first station in said system, the apparatus further comprising:
means for sending through a serial data channel a broadcast type of message intended for plural receiving stations connected to said data channel, each broadcast message being contained within a respective message frame of predetermined structure, said message frame structure including a negative acknowledgment field modifiable by any of said receiving stations so as to generate a negative acknowledgment signal, the negative acknowledgment field being shared by such receiving stations such that acknowledgment signals generated by individual stations cannot be distinguished by said apparatus;
means for sending through said serial data channel a directed type of message intended for one specified receiving station among plural stations connected to said data channel, each directed message being contained within a respective message frame of predetermined structure, said message frame structure including a positive acknowledgment field modifiable by said receiving station so as to generate a positive acknowledgment signal; and
means for detecting said negative and positive acknowledgment signals and for re-sending a message depending on the presence or absence of the positive and/or negative acknowledgment signals in their respective fields and on whether the message is a directed message or a broadcast message.

16. A diagnostic apparatus for use with a system as in claim 1, the apparatus comprising:
means for connecting to the data channel,
event detection means operable to monitor broadcast message and negative acknowledgment signals, and
data handling means operable to process data from the event detection means so as to confirm operation in accordance with said claim.

17. A system as in claim 1 wherein:
each message includes an error protection word dependent on the entire effective message content, and
the second station determines whether the newly received message is a re-sending of the previously received message by comparing the error protection words of the newly received message and the previously received message.

18. A local communication system comprising:

a plurality of stations interconnected for the exchange of messages via a serial data channel, a first station being operable to send a broadcast type of message to a plurality of other stations including a second station, said second station being operable to perform an acceptance test on a broadcast message and to provide a negative acknowledgment signal to the first station in the event of non-acceptance of the message, the first station being operable to re-send a broadcast message automatically in response to said negative acknowledgment signal being generated by at least one of the other stations, the second station being arranged to suppress generation of the negative acknowledgment signal in the case of a non-accepted received broadcast message which is a re-sending of a broadcast message previously accepted by the second station;

the second station being arranged to determine whether a newly received message is a re-sending of a previously received message by comparing at least part of the newly received message with at least part of the previously received message;

wherein each message includes an error protection word dependent on the entire effective message content, and wherein the second station determines whether the newly received message is a re-sending of the previously received message by comparing the error protection words of the newly received message and the previously received message.

19. A local communication system comprising:

a plurality of stations interconnected for the exchange of messages via a serial data channel, a first station being operable to send a broadcast type of messege to a plurality of other stations including a second station, said second station being operable to perform an acceptance test on a broadcast message and to provide a negative acknowledgment signal to the first station in the event of non-acceptance of the message, the first station being operable to re-send a broadcast message automatically in response to said negative acknowledgment signal being generated by at least one of the other stations, the second station being arranged to suppress generation of the negative acknowledgment signal in the case of a non-accepted received broadcast message which is a re-sending of a broadcast message previously accepted by the second station;

wherein the first station is also operable to send messages of a directed type to respective ones of the other stations;

wherein the first station is arranged to form each broadcast message such that a retry of an earlier message can be distinguished from a new message having identical message content, and wherein a retry of an earlier directed message is formed so as to be indistinguishable from a new message of having identical message content, and can convey more information than a broadcast message.

20. A local communication system comprising:

a plurality of stations interconnected for the exchange of messages via a serial data channel, wherein a first station is operable to send a broadcast type of message to a plurality of other stations including a second station, wherein said second station has a receive buffer for holding at least one received message prior to processing thereof and is arranged to provide a negative acknowledgment signal to the first station in the event that the message cannot be accepted because he receive buffer is still occupied by a previously received message or messages, wherein the first station is operable to re-send a broadcast message automatically in response to said negative acknowledgment signal being generated by any of the other stations, and wherein the second station is arranged to suppress generation of the negative acknowledgment signal in the case of a received broadcast message which cannot be accepted but is judged identical to a previously received message occupying the receive buffer.

21. A method of controlling a local communication system comprising a plurality of stations interconnected for the exchange of messages via a serial data channel, each message being contained within a respective message frame of predetermined structure, said method comprising:

sending a broadcast type of message from a first station to a plurality of other stations including a second station, performing an acceptance test on a broadcast message at said second station and providing a negative acknowledgment signal to the first station in the event of non-acceptance of the message, said negative acknowledgment signal being generated by modifying a negative acknowledgment field within the frame containing the broadcast message itself, the negative acknowledgment field being shared by said plurality of other stations such that acknowledgment signals generated by individual stations cannot be distinguished by the first station, re-sending a broadcast message from said first station automatically in response to said negative acknowledgment signal being generated by at least one of the other stations, and at said second station, determining whether a newly received message is a re-sending of a previously received message by comparing at least part of the newly received message with at least part of the previously received message, and (ii) suppressing generation of the negative acknowledgment signal in the case of a non-accepted received broadcast message which is a re-sending of a broadcast message previously accepted by the second station.

22. A method as in claim 21 wherein:

temporarily storing received messages in a receive buffer at the second station prior to processing thereof, and said acceptance test includes a test whether the receive buffer is occupied by a previously received message awaiting processing.

23. A method as in claim 21 wherein each broadcast message is formed such that a retry of an earlier message can be distinguished form a new message having identical effective message content.

24. A method as in claim 23 wherein:

a message identification word is included in each broadcast message, the message identification word being the same for all re-sendings of an original message, and being different for each new broadcast message of the first station, irrespective of the effective message content.

25. A method as in claim 21 wherein:

messages of a directed type are sent from the first station to respective ones of the other stations.

26. A method as in claim 25 wherein:

the acceptance test is performed on a directed message received at the second station from the first station and, if the test is satisfied to generate a positive acknowledgment signal in a positive acknowledgment field within the frame containing the directed message.

27. A method as in claim 26 further comprising:

determining whether or not to resend the message form the first station is dependent on the presence or absence of the positive and/or negative acknowledgment signals in their respective fields, and on whether the message is a directed message or a broadcast message.

28. A method as in claim 21 wherein:

the broadcast type of message can be addressed to a particular subset of all stations in the system, such that the second station ignores a broadcast message addressed to a plurality of stations excluding the second station.

29. A method as in claim 21 wherein:

the serial data channel is provided by a succession of unidirectional data links connecting the stations in a ring network.

30. A method as in claim 21 wherein:

the serial data channel is a control channel multiplexed with one or more high capacity source data channels via a single serial data link.

31. A method of controlling a local communication system comprising a plurality of stations interconnected for the exchange of messages via a serial data channel, each message being contained within a respective message frame of predetermined structure, said method comprising:

sending a broadcast type of message from a first station to a plurality of other stations including a second station, performing an acceptance test on a broadcast message at said second station and providing a negative acknowledgment signal to the first station in the event of non-acceptance of the message, said negative acknowledgment signal being generated by modifying a negative acknowledgment field within the frame containing the broadcast message itself, the negative acknowledgment field being shared by said plurality of other stations such that acknowledgment signals generated by individual stations cannot be distinguished by the first station, re-sending a broadcast message from said first station automatically in response to said negative acknowledgment signal being generated by at least one of the other stations, at said second station, determining whether a newly received message is a re-sending of a previously received message by comparing at least part of the newly received message with at least part of the previously received message, and (ii) suppressing generation of the negative acknowledgment signal in the case of a non-accepted received broadcast message which is a re-sending of a broadcast message previously accepted by the second station;

wherein each message includes an error protection word dependent on the entire effective message content, and said determining at the second station whether the newly received message is a re-sending of the previously received message is performed by comparing the error protection words of the newly received message and the previously received message.

32. A method of controlling a local communication system comprising a plurality of stations interconnected for the exchange of messages via a serial data channel, each message being contained within a respective message frame of predetermined structure, said method comprising:

sending a broadcast type of message from a first station to a plurality of other stations including a second station, performing an acceptance test on a broadcast message at said second station and providing a negative acknowledgment signal to the first station in the event of non-acceptance of the message, said negative acknowledgment signal being generated by modifying a negative acknowledgment field within the frame containing the broadcast message itself, the negative acknowledgment field being shared by said plurality of other stations such that acknowledgment signals generated by individual stations cannot be distinguished by the first station, re-sending a broadcast message from said first station automatically in response to said negative acknowledgment signal being generated by at least one of the other stations, and at said second station, determining whether a newly received message is a re-sending of a previously received message by comparing at least part of the newly received message with at least part of the previously received message, and (ii) suppressing generation of the negative acknowledgment signal in the case of a non-accepted received broadcast message which is a re-sending of a broadcast message previously accepted by the second station;

wherein messages of a directed type are sent from the first station to respective ones of the other stations; and wherein:

each broadcast message is formed such that a retry of an earlier message can be distinguished from a new message having identical message content, and a retry of an earlier directed message is formed so as to be indistinguishable from a new message of having identical message content, and can convey more information than a broadcast message.

33. A method of controlling a local communication system comprising a plurality of stations interconnected for the exchange of messages via a serial data channel, said method comprising:

sending a broadcast type of message from a first station to a plurality of other stations including a second station, holding at least one received message at the second station in a receive buffer prior to processing thereof and providing a negative acknowledgment signal to the first station in the event that the message cannot be accepted because the receive buffer is still occupied by a previously received message or messages, re-sending a broadcast message from said first station automatically in response to said negative acknowledgment signal being generated by any of the other stations, and suppressing generation of the negative acknowledgment signal at the second station in the case of a received broadcast message which cannot be accepted but is judged identical to a previously received message occupying the receive buffer.

* * * * *